(12) United States Patent
Qi (10) Patent No.: US 10,586,344 B2
(45) Date of Patent: Mar. 10, 2020

(54) SYSTEM AND METHOD FOR FEATURE SCREENING IN SLAM

(71) Applicants: Beijing Jingdong Shangke Information Technology Co., Ltd., Beijing (CN); JD.com American Technologies Corporation, Mountain View, CA (US)

(72) Inventor: Chengzhi Qi, Mountain View, CA (US)

(73) Assignees: Beijing Jingdong Shangke Information Technology Co., Ltd., Beijing (CN); JD.com American Technologies Corporation, Mountain View, CA (US)

( * ) Notice: Subject to any disclaimer, the term of this patent is extended or adjusted under 35 U.S.C. 154(b) by 215 days.

(21) Appl. No.: 15/901,871

(22) Filed: Feb. 21, 2018

(65) Prior Publication Data

US 2019/0259170 A1     Aug. 22, 2019

(51) Int. Cl.
| | |
|---|---|
| *G01C 22/00* | (2006.01) |
| *G06K 9/00* | (2006.01) |
| *G06T 7/579* | (2017.01) |
| *G06T 7/73* | (2017.01) |

(52) U.S. Cl.
CPC ............... *G06T 7/579* (2017.01); *G06T 7/74* (2017.01); *G06T 2207/20016* (2013.01); *G06T 2207/20084* (2013.01); *G06T 2207/30181* (2013.01); *G06T 2207/30244* (2013.01)

(58) Field of Classification Search
USPC ....... 382/100, 103, 106, 113, 155, 168, 173, 382/181, 199, 206, 219, 232, 254, 274, 382/276, 286–291, 305, 312; 701/25, 26, 701/28
See application file for complete search history.

(56) References Cited

U.S. PATENT DOCUMENTS

| | | | |
|---|---|---|---|
| 2015/0316930 A1* | 11/2015 | Karlsson ................ | G01C 21/12 |
| | | | 701/28 |
| 2018/0012411 A1* | 1/2018 | Richey ...................... | G06T 7/73 |
| 2018/0075643 A1* | 3/2018 | Sequeira ............... | G01C 21/206 |
| 2018/0096503 A1* | 4/2018 | Kaehler ............. | G02B 27/0172 |
| 2018/0300897 A1* | 10/2018 | Woods .................... | G06F 3/011 |

\* cited by examiner

*Primary Examiner* — Seyed H Azarian
(74) *Attorney, Agent, or Firm* — China Science Patent & Trademark US LLC; Shanyun Lu (57) ABSTRACT

A method for performing localization and mapping of a mapping device. The method includes: capturing images of environment by a visual sensor of the mapping device, and processing the captured images to obtain a set of high-resolution images and a set of low-resolution images; determining motion-scale measurement of the mapping device using an inertial sensor and an odometer; generating, by a controller of the mapping device, a first mask corresponding to dynamic features in the low-resolution images; extracting features from the high-resolution images; recovering, by the controller, poses of the mapping device based on the high-resolution images and the motion-scale measurements; filtering out, by the controller, the features from the high-resolution images that correspond to the first mask, to obtain filtered features; and performing, by the controller, localization and mapping using the poses and the filtered features.

18 Claims, 4 Drawing Sheets

SYSTEM AND METHOD FOR FEATURE SCREENING IN SLAM

CROSS-REFERENCES

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

FIELD OF THE INVENTION

The present invention relates generally to the field of image processing, and more particularly to systems and methods for key frame selection and key feature screening in visual simultaneous localization and mapping (SLAM) using deep convolutional neural network (DCNN).

BACKGROUND OF THE INVENTION

The background description provided herein is for the purpose of generally presenting the context of the invention. Work of the presently named inventors, to the extent it is described in this background section, as well as aspects of the description that may not otherwise qualify as prior art at the time of filing, are neither expressly nor impliedly admitted as prior art against the present invention.

In robotics research, visual simultaneous localization and mapping (SLAM) can be applied in many different areas, including ground robots, augmented reality (AR)/virtual reality (VR), three-dimensional (3D) reconstruction, unmanned aerial vehicles (UAV), etc. Depending on computational resource, a visual SLAM can use sparse or dense features method for pose estimation. A sparse SLAM system uses sparse feature in its obtained images, and includes steps of feature detection, feature description, feature matching, motion computation, trajectory optimization, loop closure detection, mapping, localization, etc.

Lots of sparse features are stored in a bag-of-words structure during feature detection and description, and serve as landmarks in close loop detection. When close loop detection is activated, the system checks through the bag-of-words to find a similar feature and links the new position with the old position. Based on the linked position relation, the system uses bundle adjustment to optimize the whole trajectory and correct the map. However, searching features in a large bag-of-words structure is costly and slow; on the other hand, a small bag-of-words has a limited feature storage, and cannot represent the landmarks and is prone to resulting in false matches.

Other methods have also been developed to solve movable object problem, like frequency map enhancement (FreMEn). These methods use statistical principle to obtain a movable obstacle by computing its appearance likelihood, but the methods require the robot to map the target area multiple times with a time period.

Therefore, an unaddressed need exists in the art to address the aforementioned deficiencies and inadequacies.

SUMMARY OF THE INVENTION

In certain aspects, the present invention relates to a method for performing localization and mapping of a mapping device. In certain embodiments, the method includes: capturing images of environment by a visual sensor of the mapping device, and processing the captured images to obtain a set of high-resolution images and a set of low-resolution images; determining motion-scale measurement of the mapping device using an inertial sensor and an odometer; generating, by a controller of the mapping device, a first mask corresponding to dynamic features in the low-resolution images; extracting features from the high-resolution images by the controller; recovering, by the controller, poses of the mapping device based on the high-resolution images and the motion-scale measurements, and; filtering out, by the controller, the features from the high-resolution images that correspond to the first mask, to obtain filtered features; and performing, by the controller, localization and mapping using the poses and the filtered features.

In certain embodiments, the low-resolution images are downsampling RGB images, and the high-resolution images are gray images.

In certain embodiments, the first mask is generated using deep neural network (DNN). In certain embodiments, the method further includes: generating a second mask corresponding to temperate stable features in the low-resolution images using DNN, and generating a third mask corresponding to stable features in the low-resolution images using DNN. In certain embodiments, the generating of the first, second and third mask using DNN includes: performing DNN classification on the low-resolution images, such that objects in the low-resolution images are identified and classified as the dynamic features, the temperate stable features, and the immortal stable features; and generating the first, second and third masks respectively corresponding to the dynamic features, the temperate stable features, and the immortal stable features.

In certain embodiments, the step of processing the captured images comprises: adjusting format, size, and light balance of the images.

In certain embodiments, the step of determining motion-scale measurement includes: obtaining inertial measurements from the inertial sensor and distance measurement from the odometer continuously; integrating the inertial measurements and distance measurements to determine the motion-scale measurements of the mapping device.

In certain embodiments, the method further includes, after the step of filtering out the features from the high-resolution images to obtain filtered features: determining if any one of the high-resolution images is a key frame. In certain embodiments, the method further includes, after the step of filtering out the features from the high-resolution images to obtain filtered features: setting up a sliding window to store a predetermined number of the high-resolution images.

In certain embodiments, the method further includes, before the step of performing location and mapping: synchronizing the motion-scale measurement with the high-resolution images. In certain embodiments, the filtered features includes temperate stable features and immortal stable features, and the step of performing localization and mapping using the poses and the filtered features includes: detecting loop closure and optimizing global state using the poses and the immortal stable features; optimizing local state using the poses, the temperate stable features and the immortal stable features; and updating a map of the environment based on the optimized global state and local state.

In certain embodiments, the generating a first mask is executed in a first thread, the recovering the poses is executed in a second thread, the detecting loop closure and optimizing global state is executed in a third thread, and optimizing local state is executed in a fourth thread, where the first, second, third, and fourth threads are executed in parallel in a processor of the controller.

In certain embodiments, each of the poses includes a rotation and a translation of the mapping device corresponding to one of the high-resolution images.

In certain embodiments, the mapping device comprises a ground robot, an augmented reality (AR) device, a virtual reality (VR) device, a three-dimensional (3D) map reconstruction device, and an unmanned aerial vehicle (UAV).

In certain aspects, the present invention relates to a mapping device. In certain embodiments, the mapping device includes a visual sensor, an inertial sensor, an odometer, and a controller, and the mapping device is configured to perform the method as described above.

In certain embodiments, the visual sensor is configured to capture images of environment; the inertial sensor and the odometer are configured to determine motion-scale measurement of the mapping device; the controller is configured to:

process the captured images to obtain a set of high-resolution images and a set of low-resolution images;

generate a first mask corresponding to dynamic features in the low-resolution images;

extract features from the high-resolution images;

recover poses of the mapping device based on the high-resolution images and the motion-scale measurements;

filter out the features from the high-resolution images that correspond to the first mask, to obtain filtered features; and perform localization and mapping using the poses and the filtered features.

In certain embodiments, the controller is configured to: perform deep neural network (DNN) classification on the low-resolution images such that objects in the low-resolution images are identified and classified as the dynamic features, temperate stable features, and immortal stable features; and generate the first mask, a second mask, and a third mask corresponding to the dynamic features, the temperate stable features, and the immortal stable features.

In certain embodiments, the controller is configured to process the captured images by: adjusting format, size, and light balance of the images.

In certain embodiments, the controller is configured to generate the first mask in a first thread, recover the poses in a second thread, detect loop closure and optimize global state in a third thread, and optimize local state in a fourth thread, and the first, second, third, and fourth threads are executed in parallel in a processor of the controller.

In certain aspects, the present invention relates to a non-transitory computer readable medium storing computer executable code. In certain embodiments, the computer executable code, when executed at a processor of a controller of a mapping device, is configured to perform the method described above.

In certain embodiments, the executed code is configured to: process images of environment captured by a visual sensor, to obtain a set of high-resolution images and a set of low-resolution images; generate a first mask corresponding to dynamic features in the low-resolution images; extract features from the high-resolution images; recover poses of the mapping device based on the high-resolution images and motion-scale measurements determined from an inertial sensor and an odometer; filter out the features from the high-resolution images that correspond to the first mask, to obtain filtered features; and perform localization and mapping using the poses and the filtered features.

In certain embodiments, the executed code is configured to: perform deep neural network (DNN) classification on the low-resolution images such that objects in the low-resolution images are identified and classified as the dynamic features, temperate stable features, and immortal stable features; generate the first mask, a second mask, and a third mask corresponding to the dynamic features, the temperate stable features, and the immortal stable features; generate the first, second and third masks in a first thread, recover the poses in a second thread, detect loop closure and optimize global state in a third thread, and optimize local state in a fourth thread, and the first, second, third, and fourth threads are executed in parallel in the processor.

These and other aspects of the present invention will become apparent from the following description of the preferred embodiment taken in conjunction with the following drawings and their captions, although variations and modifications therein may be affected without departing from the spirit and scope of the novel concepts of the invention.

BRIEF DESCRIPTION OF THE DRAWINGS

The present invention will become more fully understood from the detailed description and the accompanying drawings. These accompanying drawings illustrate one or more embodiments of the present invention and, together with the written description, serve to explain the principles of the present invention. Wherever possible, the same reference numbers are used throughout the drawings to refer to the same or like elements of an embodiment, and wherein.

DETAILED DESCRIPTION OF THE INVENTION

The present invention is more particularly described in the following examples that are intended as illustrative only since numerous modifications and variations therein will be apparent to those skilled in the art. Various embodiments of the invention are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention. Additionally, some terms used in this specification are more specifically defined below.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

Unless otherwise defined, all technical and scientific terms used herein have the same meaning as commonly understood by one of ordinary skill in the art to which this invention pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present invention.

As used herein, the term "module" or "unit" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module or unit may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present invention may be implemented by computer systems. As depicted in the drawings, computer components may include physical hardware components and virtual software components. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

In certain aspects of the present invention, a semantic map is developed, and objects are classified by deep learning method such as deep neural network (DNN). This approach significantly helps the robot to understand nearby environment and provides more clues for the robot to make decisions. However, the heavy computational load (generally more than 30 Mb parameters) requires a Titan X GPU for running in real time (30 fps).

In certain aspects of the present invention, to solve the heavy computation load problem, a deep convolutional neural network (DCNN) based feature screening method is provided. In certain embodiments, the method provides a fast and reliable way for key frame selection and key feature screening, which reduces the computational load and increases accuracy for mapping and loop closure detection.

In certain embodiments, the present invention relates to a robot equipped with visual sensors and computation units. The visual sensors may include, but not limited to, camera or other visual capture device.

In certain embodiments, a data collection step is performed, where a robot navigates in a pre-mapped environment with designed trajectories and acquired image data.

In certain embodiments, data pre-process is performed to prepare data collected from a specific environment. The pre-processed data can then be used for training a DCNN model under that environment. When the DCNN model is available, and new environment slightly changes from the previous environment, pre-processed data of the new environment can be used to fine tune the model. During data pre-processing, video frames for good landmark area, such as a bridge, a building, or a sculpture, etc. are labeled by a user or a robotic device, where the landmarks are unmovable, distinguishable, and feature reproducible. In certain embodiments, the pre-processing of data is only needed when training or fine tuning the DCNN model. When the DCNN model is well trained, there is no need to label the data, and the DCNN model can recognize the unmovable or movable features from the data.

Then the pre-processed data can be used to train the system. Specifically, video frames are fed into a light-weighted DCNN structure (residual net or similar DNN structure, other reinforcement learning such as reinforcement learning, deep q-learning) to train. For example, deep Q-learning uses the bundled map re-projection error comparing with the ground truth as the cost function and updated its models accordingly, in this case the reward function is the state estimated error. Other network can simply use image annotation ground truth for training. The goal of the network is to generate a mask template with scores of different regions in the image. The SLAM system uses this mask template to decide landmarks' distribution in the image and uses the desired features to be stored as landmarks in the bag-of-words structure. In addition, this template provides an additional examination to determine if the current scene should be saved as a key frame in the mapping system. Combined with traditional landmark selection rules (feature reliability, feature repeating rate, landmark distribution in the global map), landmark data set was significantly reduced. Further, features from movable object have a good chance to be filtered out and not be stored. Since the network was a simple scoring mask for the input image, a light network could fully serve the system demand. A very low-cost computation unit would be enough for the robot to conduct such the real-time use (30-60 fps).

Those reduced landmark data can then be used for mapping, loop closure detection and localization. In certain embodiments, a light-weight and reliable landmarks data set is generated by the previous step. These landmarks are extremely helpful when a real-time robot maps an area with few routes. Most of the moving objects' feature in the data set were filtered, so that it caused less mis-linked positions during close loop detection as well as reduced computation load. The data also serves as ground true during localization. With less data and fewer outliers, the computational time was speed up and more reliable.

Due to the above cited advantages, the system according to certain embodiments of the present invention can be further extended for real-time semi-dense SLAM. A big limitation for dense and semi-dense SLAM is the computational load for a large batch of feature/pixel matching. A light-weighted DNN based mask generated an efficient way for outliers filtering and data association while the feature/pixel data had a pre-matching association based on a different score for each region/pixel in the image. This would help the robot gathering and matching data and resulting in an improved SLAM system.

In summary, certain embodiments of the present invention relate to a DCNN based feature screening learning method. The innovation includes but not limit to: 1. Data collection; 2. Data Processing; 3. DNN training; and 4. Mapping and Localization. This innovation improves key frame selection and key point screening, which significantly trims down the size of feature set and improves reliability. This advantage reduces the computational load during close loop detection and localization; and increases accuracy for mapping and close loop detection. It also provides a feasible solution of semi-dense/dense SLAM.

The present invention will now be described more fully hereinafter with reference to the accompanying drawings, in which embodiments of the present invention are shown. This invention may, however, be embodied in many different forms and should not be construed as limited to the embodiments set forth herein; rather, these embodiments are provided so that this invention will be thorough and complete, and will fully convey the scope of the present invention to those skilled in the art.

In certain aspect of the present invention, a device is provided. The device may be a ground robotic device, an AR/VR device, a 3D reconstruction device, or an UAV etc.

Figure 1:
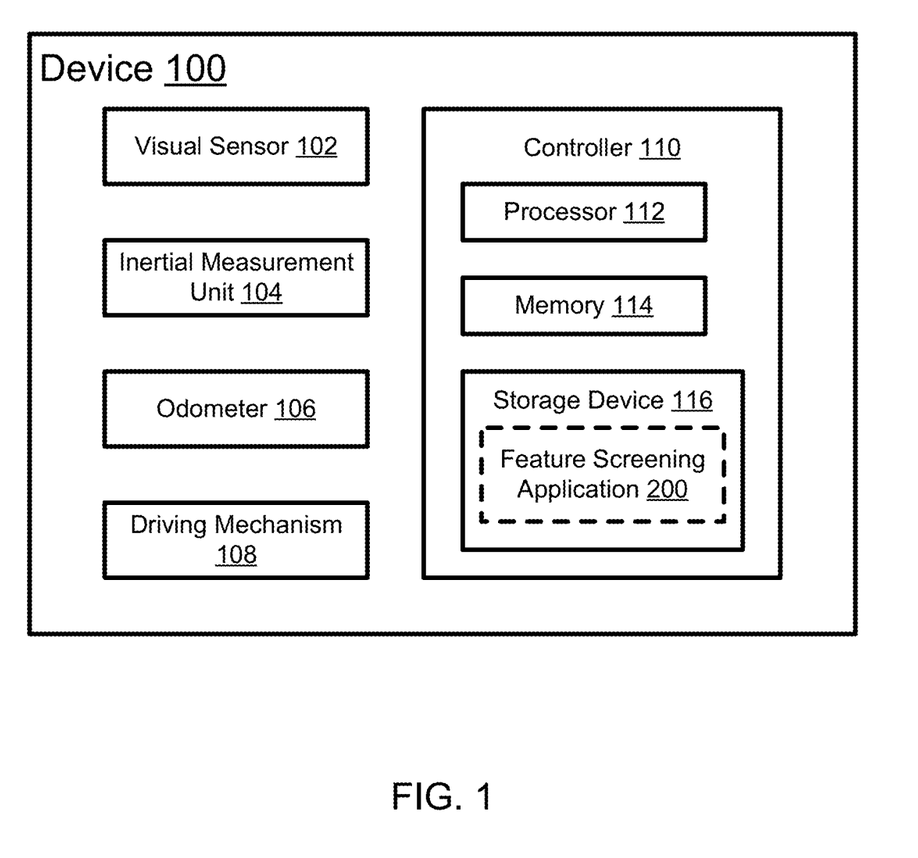
FIG. 1 schematically depicts a mapping device according to certain embodiments of the present invention.

FIG. 1 schematically shows a mapping device 100 according to certain embodiments of the present invention. As shown in FIG. 1, the mapping device 100 includes a visual sensor 102, an inertial measurement unit (IMU) 104, an odometer 106, a driving mechanism 108 and a controller 110. The visual sensor 102, such as a camera, is configured to capture images or videos of the environment or target objects. The IMU 104, which may include one or more inertial sensors, such as accelerometers, gyroscopes and magnetometers, are configured to perform inertial measurement of the mapping device 100, so as to report orientation values of the mapping device 100. The odometer 106, such as a wheel odometer, is configured to measure distance traveled by the device, so as to report translation of the mapping device 100. Combining the three degree of freedom (DOF) in translation (left/right, forward/back, and up/down) measured by the IMU 104 and the three DOF in rotation (pitch, yaw, and roll) measured by the odometer 106, a six DOF of the mapping device 100 are obtained to determine the pose of the mapping device 100. The driving mechanism 108 is configured to drive the mapping device 100, and may include one or more motors, gears, legs, arms, fingers, power supply such as batteries, etc. The controller 110 is in communication with the visual sensor 102, the IMU 104, the odometer 106, and the driving mechanism 108, and is configured to control the operation of the mapping device 100. In certain embodiments, the mapping device 100 may include other necessary components corresponding to the function of the mapping device 100. Exemplary other components may include an interactive interface for communicating with other devices, such as a wireless connection with a central computer. In other embodiments, the mapping device 100 may not include all the components 102-110.

In certain embodiments, the controller 110 may be a computing device, which includes a processor 112, a memory 114, and a storage device 116 storing computer executable code. The computer executable code includes a feature screening application 200 and optionally other applications such as an operating system. The processor 112 controls operation of the controller 110. In certain embodiments, the processor 112 may be a central processing unit (CPU). The memory 114 may be a volatile memory, such as the random-access memory (RAM), for storing the data and information during the operation of the controller 110. In certain embodiments, the memory 114 may be a volatile memory array. In certain embodiments, the controller 110 may run on more than one processor 112 and/or more than one memory 114. The storage device 116 is a non-volatile data storage media or device for storing the feature screening application 200 of the controller 110. Examples of the storage device 116 may include flash memory, memory cards, USB drives, or other types of non-volatile storage devices such as hard drives, floppy disks, optical drives, or any other types of data storage devices. In certain embodiments, the controller 110 may have more than one storage device 116. In certain embodiments, the control 110 may also include a remote storage device 116. The feature screening application 200 include the code or instructions which, when executed at the processor 112, may perform certain features to control the operation of the mapping device 100.

Figure 2:
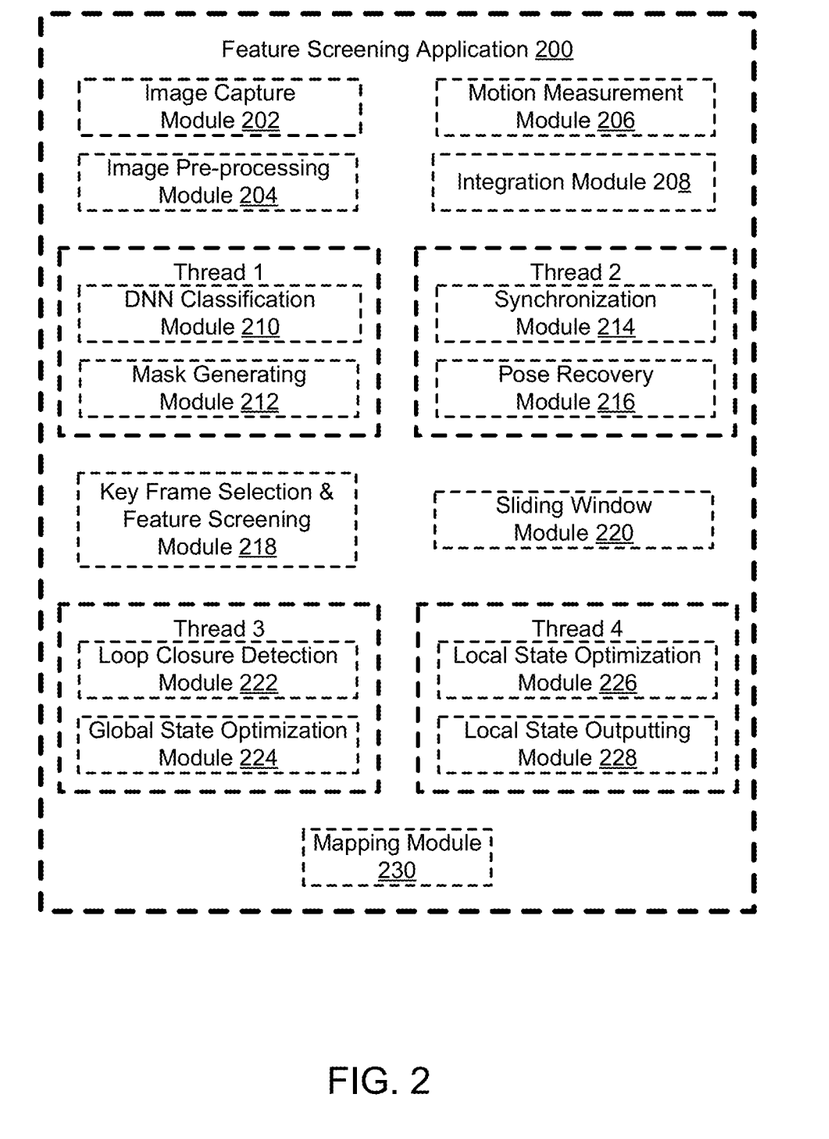
FIG. 2 schematically depicts a feature screening application of the mapping device according to certain embodiments of the present invention.

FIG. 2 schematically shows the feature screening application 200 according to certain embodiments of the present invention. As shown in FIG. 2, the feature screening application 200 includes, among other things, an image capture module 202, an image pre-processing module 204, a motion measurement module 206, an integration module 208, a DNN classification module 210, a mask generating module 212, a synchronization module 214, a pose recovery module 216, a key frame selection and feature screening module 218, a sliding window module 220, a loop closure detection module 222, a global state optimization module 224, a local state optimization module 226, a local state outputting module 228, and a mapping module 230. The mask generating module 212 and the synchronization module 214 are defined as a module for performing thread 1; the synchronization module 214 and the pose recovery module 216 are defined as a module for performing thread 2; the loop closure detection module 222 and the global state optimization module 224 are defined as a module for performing thread 3; and the local state optimization module 226 and the local state outputting module 228 are defined as a module for performing thread 4. The controller 110 is configured to run the four threads in parallel, so as to improve the efficiency of the feature screening application 200.

The image capture module 202 is configured to communicate with the visual sensor 102, and instruct the visual sensor 102 to capture images or video frames. In certain embodiments, the captured images or frames are RGB color images. In other embodiments, the captured images or frames are gray images. Once the visual sensor 102 captures images or frames, the visual sensor 102 then send the images to the image pre-processing module 204.

The image pre-processing module 204, upon receiving the RGB images from the visual sensor 102, is configured to process the RGB images. The processing of the RGB image includes adjusting the format and size (or resolution), light balance, or additional image processing. The processed images may include processed RGB images and processed gray images. The processed RGB images have the same format and size, and the processed gray images have the same format and size. Further, the exposure time of the visual sensor 102 uses may be different based on the environment lighting, and the pixels of the same object in the captured images may have different characters such as densities due to variation of environment light. Therefore, light balance adjustment is necessary to compensate the light difference such that the objects in different images are comparable. In certain embodiments, the resolution of the processed RGB images is less than the resolution of the processed gray images. The resolution of the processed RGB images could be $1/32$-$1/2$ of the resolution of the processed gray image. In certain embodiments, the resolution of the processed RGB images is $1/4$, $1/8$ or $1/16$ of the resolution of the processed gray images. For example, when the captured images have 1920×1080 pixels, the processed gray images may keep the 1920×1080 pixels, while the processed RGB images may only have 960×540 pixels. After processing, the processed RGB images are sent to the DNN classification module 210, and the processed gray images are sent to the synchronization module 214. In certain embodiments, the image pre-processing module may also process the captured images to obtain two set of gray images. One set of gray images having a lower resolution are sent to the DNN classification module 210, and the other set of gray images having a higher resolution are sent to the synchronization module 214. The low-resolution images make the process of thread 1 fast without harming the accuracy. While the high-resolution images provide sufficient information for defining features, poses, and maps.

The motion measurement module 206 is configured to control the IMU 104 and the odometer 106 to measure the translation and rotation motions of the mapping device 100. In certain embodiments, the measurement result includes six DOF measurement of the mapping device 100, with three translation DOF and three rotation DOF. The measurement results are respectively sent by the IMU 104 and the odometer 106 to the integration module 208. In certain embodiments, the rotation DOF and the translation DOF measured by the IMU 104 and the odometer 106 may also be combined before being sent to the integration module 208.

The integration module 208 is configured to integrate the rotation DOF and the translation DOF. The translation and rotation DOF measured by the IMU 104 and the odometer 106 are instant measurement of the mapping device 100. To obtain the translation and rotation of the mapping device 100, those instant measurement need to be integrated through time. The time-integrated measurement includes rotation and translation of the mapping device 100 relative to its starting position. In other words, the time-integrated measurement provides a rough estimation of the current pose of the mapping device 100. The time-integrated measurement, which may be a six DOF, are sent to the synchronizing module 214.

The DNN classification module 210 is configured to receive the processed RGB images from the image pre-processing module 204, and perform DNN classification on the processed RGB images. Specifically, the DNN classification module 210 detect objects from the RGB image, and classify the detected objects into three categories: dynamic environment, temperate stable environment, and immortal stable environment. The immortal stable environment, or simply stable environment, may include permanent landmarks such as bridge, building, sculpture, etc. Those immortal stable objects are unmovable, distinguishable, and feature reproducible. The dynamic environment may include a walking person, a moving car, a flying balloon, etc. The locations of those dynamic objects change fast. The temperate stable environment, which may include a person sitting in a chair, a car parked in a parking spot, a vending cart for selling foods or magazines. Those temperate stable objects may stay in a same location for a period of time, and then moves. Each of the detected objects may have corresponding feature points and/or feature descriptors. In certain embodiments, a bag-of-words structure may be used to define those detected objects, and the objects in the bag-of-words structure can be linked to or defined by one of the three categories. In certain embodiments, ways for defining feature of the detected objects other than the bag-of-words may be used, as long as those featured objects can be distributed to one of the three categories. In certain embodiments, DCNN is used for the above classification. In certain embodiments, a light DCNN is sufficient because there are only three categories to be defined. After DNN classification, the RGB images received and processed by the DNN classification module 210 give a multi-channel image data, where each pixel is provided with a score and a classification result. In certain embodiments, each pixel has three channels, and the three channels correspond to the dynamic environment, the temperate stable environment, and the immortal stable environment. The pixel has a score at each of the three channels, and the score corresponds to the possibility/weight that the pixel belongs to that channel. For example, if a pixel evaluated by the DNN model to have a 70% possibility of being a part of dynamic environment, a 20% possibility of being a part of temperate stable environment, and a 10% possibility of being a part of the immortal stable environment, the scores or weights of the pixel in the three channels may be respectively 0.7, 0.2, and 0.1. Using a filter function and an appropriate threshold, the pixel can be determined to be a pixel of being a part of temperate stable environment. Three types of continuous masks are then constructed based on the channel of the pixels. In certain embodiments, pixels in the three types of masks may be defined with the number 0, 1, and 2 as the classification result. The pixels having the classification of 2 form the dynamic environment mask, the pixels having the classification of 1 form the temperate stable environment mask, and the pixels having the classification of 0 form the immortal stable environment mask. Because the objects are classified into only three categories other than tens of, hundreds of or more categories, the process is fast and efficient, and don't require much of details of the objects. Accordingly, the resolution requirement for the received RGB images is not strict, and low-resolution images are good enough for the process. In certain embodiments, a specific designed database is used to train the DNN. In other embodiments, a bag of word database publicly available may be used, where the large number of characteristics are separated to and linked to the three categories, that is, the dynamic environment, the temperate stable environment, and the immortal stable environment.

The mask generating module 212, upon receiving the multi-channel image data, generates a mask. The multi-channel image data may include objects that are labeled respectively as one of the three classifications. The mask generating module 212 generates one or more binary image masks based on the three classification categories. In certain embodiments, three masks are available, respectively corresponding to the dynamic environment, the temperate stable environment, and the immortal stable environment. In certain embodiments, there are only two masks corresponding to dynamic environment and stable environment, where no differentiation between the temperate stable environment and the immortal stable environment are required. In certain embodiments, only one mask is available corresponding to the dynamic environment, and the other portions of the images are just left is default and no operation on those portions are needed.

The synchronization module 214 receives the gray images from the image pre-processing module 204 and the six DOF time-integrated measurement of the mapping device 100 from the integration module 208. The speed of image capturing and pre-processing and the speed of motion measurement and integration are likely to be different from each other. Therefore, upon receiving the gray images and the time-integrated measurement, the synchronization module 214 is configured to synchronize those gray images ant the time-integrated measurement, so as to output time sequencing ordered gray images and time-integrated measurement data. In certain embodiments, the synchronization module 214 may allocate a first buffer for the gray images and a second buffer for the time-integrated measurement, and then retrieve the gray images and the time-integrated measurement from the buffers based on their time tags, so as to obtain gray images and the corresponding time-integrated measurement in a time sequence manner.

The pose recovery module 216 receives from the synchronization module 214 of the time synchronized data. The synchronized data includes images such as high-resolution gray images with for example time tags, and time-integrated data such as IMU/Odometry data. Upon receiving those synchronized data, the pose recovery module 216 is configured to calculate the pose, that is, the rotation and transition of the mapping device 100. In certain embodiments, the pose recovery module 216 may use a visual inertial odometry (VIO) technique to fuse the information from the visual sensor 102, the inertial IMU 104, and the odometer 106 to estimate poses of the mapping device 100. In addition, the pose recovery module 216 is further configured to extract features from the gray images before estimating the pose.

The key frame selection and feature screening module 218 receives binary image masks from the mask generating module 212 and the poses and features from the pose recovery module 216. The key frame selection and feature screening module 218 is configured to match the masks with the extracted features, and drops the features that corresponds to the dynamic environment out of the masks. The removing of those feature may be based on the value of the pixels, such as all the pixels that have the value of 2 and correspond to pixels of the dynamic environment. The key frame selection and feature screening module 218 is further configured to determine whether a frame is a key frame based on the feature quality. In certain embodiments, the determination may be performed after the dropping out the dynamic feature. In other words, after removing of the dynamic feature, the quality of the remaining immortal and/or temperate stable features are evaluated. In certain embodiments, the key frames are selected at a predetermined distance interval or time interval. However, with the information of the masks, the key frame selection and feature screening module 218 is configured to select a key frame around the corresponding distance or time interval, with the consideration of the masks. In certain embodiments, the key frame selection and feature screening module 218 chooses a few frames around a distance or time interval, and select one frame from the few frames that has a larger immortal stable environment mask. The number of the few frames selected may vary. In certain embodiments, the number of the few frames is in a range of 2-100 frames, preferably 5-50 frames, and more preferably 10-20 frames. After processing by the key frame selection and feature screening module 218, rotation and translation corresponding to a frame, and stable feature of the frame are obtained. Those poses (rotation and translation) and stable features of each frame are then sent to the sliding window module 220.

The sliding window module 220 is configured to set up a sliding window that is capable of keeping information of a predetermined number of frames, and receive the rotation, the translation, and the stable features of the frames continuously from the key frame selection and feature screening module 218. The frame information stored in the sliding window each include rotation, translation and features of the corresponding frames. The frame information inputted and outputted from the sliding window is in a first-in first-out (FIFO) method. The sliding window module 220 is further configured to receive, when available, map information from the mapping module 230, where the map is constructed and updated using rotation, translation, and features. The sliding window module 220 then sends a list of rotation, translation and features of immortal stable features of the updated map information to the loop closure detection module 222, and sends a list of rotation, translation and features of immortal and temperate stable features of the recent frames to the local state optimization module 226.

The loop closure detection module 222 is configured to, upon receiving the updated map information that contains a list of translation, rotation and features, match the newly obtained features from the sliding window with the features in the map. When matching is observed, the matched features can be used to detect that a loop is formed. To have high efficiency and accuracy, the matching is performed using only the immortal stable features.

The global state optimization module 224 is configured to, based on the rotation, translation, and matched features from the loop closure detection, optimize six DOF (rotation and translation) of the mapping device 100 by solving an optimization problem to reduce re-projection error of features. Because the dynamic features, and optionally the temperate stable features are removed from the optimization, the optimization is much more fast and accurate.

The local state optimization module 226 is configured to, upon receiving the list of rotation, translation, and features in a short window (for example, the sliding window), optimize six DOF (rotation and translation) of the pose of the mapping device 100 by solving an optimization problem to reduce re-projection error of features. In certain embodiments, the local state optimization module 226 uses the gradient decent method on feature 3D location in global frame and robot 3D location frame and minimize the difference of the sum of feature re-projection error in all the frame in the short window. The features used here include immortal stable features and temperate stable features, so as to provide more information for the accurate local optimization. Because the dynamic features are removed from the optimization, the local optimization is much more fast and accurate.

After local optimization, the local state optimization module 226 is configured to send the six DOF of the device pose to the local state outputting module 228, and send the six DOF and the features to the mapping module 230.

The local state outputting module 228 is configured to, in response to receiving the current pose of the mapping device 100, communicate the current pose to other components of the mapping device 100 or other devices.

The mapping module 230 is configured to update the map, in response to receiving the rotation, the translation, the features including matched features from the global state optimization module 224, and the rotation, translation and features of the recent frames from the local state optimization module 228. During the updating, the global state optimization module 224 provide overall information especially the matched features, while the local state optimization module 228 provide accurate current pose, which make the map complete and accurate. In the beginning of the time when no map is available, the mapping module 230 is also configured to construct an initial map based on the information from the first set of frames.

Figure 3:
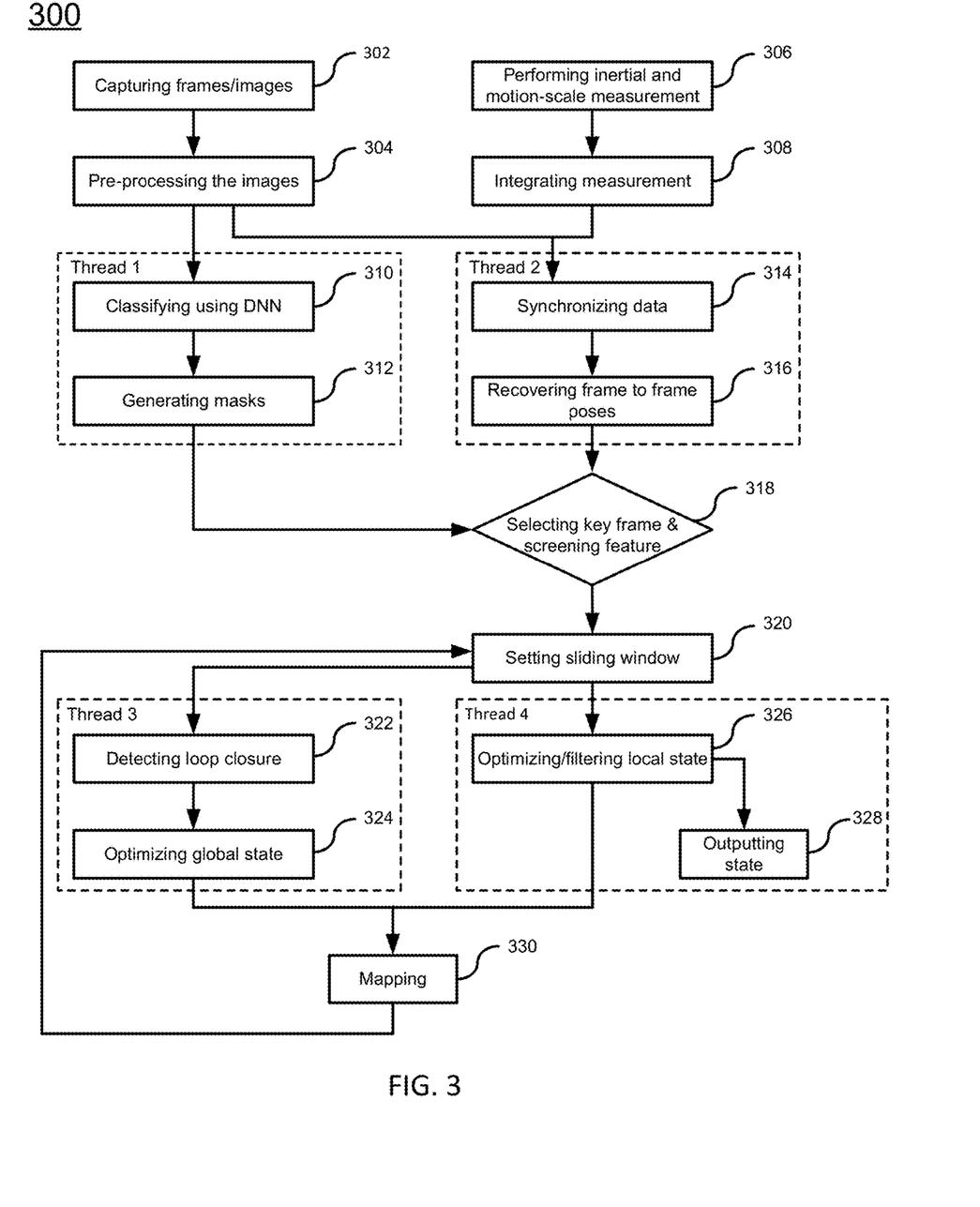
FIG. 3 schematically depicts a flowchart of a method for mapping according to certain embodiments of the present invention.

In certain aspects, the present invention relates to a mapping method. FIG. 3 is a flowchart showing a mapping method using feature screening according to certain embodiments of the present invention. In certain embodiments, the method as shown in FIG. 3 may be implemented on a device as shown in FIGS. 1 and 2. It should be particularly noted that, unless otherwise stated in the present invention, the steps of the method may be arranged in a different sequential order, and are thus not limited to the sequential order as shown in FIG. 3.

At procedure 302, upon receiving an instruction from the image capture module 202, the visual sensor 102 takes a series of images or video frames, and sends the images to the image pre-processing module 204. In certain embodiments, the images are RGB color images. In other embodiments, the images may also be gray images.

Upon receiving the RGB images or gray images, at procedure 304, the image pre-processing module 204 processes the images by adjusting the format, the size, and the light balance of the images, and obtains processed RGB images and processed gray images. The resolution or size of the processed gray image is greater than the resolution or size of the processed RGB images. The processed images thus include high-resolution and low-resolution gray images, or high-resolution gray images and low-resolution RGB images. The image pre-processing module 204 then sends the processed low-resolution RGB images or low-resolution gray images to the DNN classification module 210, and sends the processed high-resolution gray images to the synchronization module 214.

At procedure 306, upon receiving an instruction from the motion measurement module 206, the IMU 104 measures three rotation DOF of the mapping device 100, and the odometer 106 measures three translation DOF of the mapping device 100, and the three rotation DOF and the three translation DOF of the mapping device 100, which are added up to six DOF of the instant measurement, are sent to the integration module 208.

At procedure 308, upon receiving the six DOF of the mapping device 100 which are instant measurement, the integration module 208 integrates those instant measurement to obtain a time-integrated measurement of six DOF. The integration may be performed by a closed-form math solution for linear and rotational motion integration. The integrated six DOF of the mapping device 100 is then sent to the synchronization module 214. In one example, an acceleration measured by an accelerometer of an IMU is denoted $\vec{\alpha}$, and a gyro acceleration measured by a gyroscope of the IMU is denoted $\vec{\omega}$. The position of the robot is represented as position $\vec{p}$ (x, y, z) and orientation q (quaternion). The initial position of the robot is $\vec{p_0}$, the initial speed of the robot is $\vec{v_0}$, and the initial orientation of the robot is $q_0$. At the ith measurement, the position of the robot is $\vec{p_I}$, the speed of the robot is $\vec{v_I}$, and the orientation of the robot is $q_i$. The time difference between two measurements is $\Delta t$, for example the time difference between the initial measurement and the first measurement $\Delta t_1$, and the time difference between i-1th measurement and ith measurement is $\Delta t_i$. Then at the nth measurement:

$$\vec{v_n} = \vec{v_0} + \sum_{i=1}^{n} q_{i-1} \otimes (\vec{a_i} * \Delta t_i); \quad (1)$$

$$\vec{p_n} = \vec{p_0} + \sum_{i=1}^{n} \vec{v_0} * \Delta t_i; \quad (2)$$

and $$q_i = \begin{bmatrix} \frac{\vec{w_i}}{|\vec{w_i}|} \sin\frac{|\vec{w_i}| * \Delta t_i}{2} \\ \cos\frac{|\vec{w_i}| * \Delta t_i}{2} \end{bmatrix} \otimes q_{i-1}. \quad (3)$$

In the equations of (1)-(3), $\vec{v_n}$ and $\vec{p_n}$ respectively denote the speed and the position of the robot at the nth measurement, $\otimes$ denotes quaternion multiplication, $q_{i-1}$ and $q_i$ respectively denote the orientations of the robot at the i-1th and ith measurement, and $\vec{a_I}$ and $\vec{w_I}$ respectively denote acceleration and gyro acceleration during the i-1th and the ith measurement.

At procedure 310, the DNN classification module 210 processes the RGB images received from the image pre-processing module 204. In certain embodiments, the images received are low resolution gray images. In certain embodiments, based on the DNN used, downsampled RGB images can also be used. The procedure 310 may include identifying objects from the RGB images, calculating feature descriptors of the objects, determines the characteristics of the object based on the feature descriptors, and classifying the objects into one of three categories: dynamic environment, temperate stable environment, and immortal stable environment. For example, trees, tables, buildings may be classified as immortal stable environment, a human sitting in a chair, a sleeping animal, a vendor car besides a street may be classified as temperate stable environment, and a moving human, a running car, a flying drone may be classified as dynamic environment. In certain embodiments, the DNN classification module 210 then assigns 2 to pixels of the dynamic environment, assigns 1 to pixels of the temperate stable environment, and assigns 0 to pixels of the immortal stable environment. Upon accomplishing the above classification, the DNN classification module 210 sends the result, i.e., multi-channel image data, to the mask generating module 212. In the multi-channel data, such as three-channel data, the three channels respectively correspond to dynamic environment, temperate stable environment, and immortal stable environment of each pixel, and each of the three channels is attributed with a percentage or possibility by the DNN classification module 210. For example, for a specific pixel, it may have a 70% possibility of belonging to dynamic environment, 20% possibility of belonging to temperate stable environment, and 10% possibility of belonging to immortal stable environment, where the 70%, 20% and 10% possibility are respectively linked to the three channels. In certain embodiments, a filtering process is performed on the three channels, such that the above pixel is determined to belong to dynamic environment, and is then defined by the value 2. In certain embodiments, the DNN is trained before being used at procedure 310. The training of the DNN may be performed using data labeled by a user. In certain embodiments, the data may be obtained from another source. The obtained data may comprise a large number of category of objects, and the large number of category of objects are simply distributed into three categories: dynamic objects, temperate stable objects, and immortal stable objects, and then used to train the DNN. At procedure 312, in response to receiving the multi-channel image data, the mask generating module 212 generate one or more masks based on the value of the pixels, where each mask includes a plurality of pixels that have the same value. In certain embodiments, the procedure 312 may further include a filtering step to remove noises and discontinues portion of the masks, so as to obtain smooth masks. For example, if a mask includes pixels having a value 2, and a few pixels having the value 0 is embedded in those pixels having the value 2, then the few pixels having the value 0 may be changed to have a value of 2 or be removed from the image. In certain embodiment, the generated masks include a first, a second, and a third masks respectively corresponding to dynamic, temperate stable, and immortal stable environments. In certain embodiments, the generated masks include a first and a second mask respectively corresponding to dynamic and stable environments, where no differentiation is required for temperate stable and immortal stable environments. In certain embodiments, the generated masks may include only one mask corresponding to the dynamic environment.

At procedure 314, upon receiving the gray images from the image pre-processing module 204 and the time-integrated measurement from the integration module 308, the synchronization module 214 sorts those data in a time sequence order. For example, the synchronization module 214 may allocate a first buffer for the gray images and a second buffer for the time-integrated measurement. Each gray image and each time-integrated measurement may have its own time tag. The synchronization module 214 then matches the gray images with the time-integrated measurements that having the same time tags, and output gray images and the corresponding time-integrated measurement in a time sequence order.

After obtaining those time sequenced gray images and the corresponding time-integrated measurement, at procedure 316, the pose recovery module 216 fuses those information, and estimates pose of the mapping device 100. The estimation of the camera poses at this time may not be accurate and will be refined later, for example at procedures 322 and/or 326. The resulting poses are expressed as rotation and translation of the mapping device 100 over time. In certain embodiments, there is one pose corresponding to each of the images. In certain embodiments, the procedure 316 is performed using VIO technique. In addition, the procedure 316 includes, before estimating poses, extracting features from the gray images. The extraction of features may include identifying feature points, calculating feature descriptors of the feature points, detecting planes and corners, etc.

At procedure 318, upon receiving one or more masks from the mask generating module 212 and receiving the poses and features from the pose recovery module 216, the key frame selection and feature screening module 218 matches the one or more masks derived from the RGB image with the features extracted from the correspond gray image, and remove the features or feature points that correspond to the first mask. Accordingly, the dynamic features are dropped out, and the stable features are kept, which are within the masks. In addition, after dropping out the dynamic features, key frame selection is performed based on the quality of the features. In certain embodiments, a key frame is selected depends on time/distance passed and the masks. For example, a frame may be selected in every 15 seconds-20 seconds, where the frame has certain number of new features. Further, the frame is evaluated by the masks, and if the frame has too many dynamic objects, the frame may not be selected as a key frame. Instead, the robotic mapping device 100 selects a later frame as a key frame, which does not include too many dynamic objects.

At procedure 320, the sliding window module 220 sets up a sliding window that can contain information of a certain number of recent key frames, receives the rotation, the translation, and the stable features of the frames continuously from the key frame selection and feature screening module 218, and receives map information from the mapping module 230. The map information includes rotation, translation and features. The number of the key frames in the sliding window may be about 5-10 frames. The frame information from the key frame and feature screening module 218 is then used to update the map information or extend the map. The sliding window module 220 then sends the newly updated map information to the loop closure detection module 222, and sends the newly received frame information to the local state optimization module 226.

At procedure 322, the loop closure detection module 222, upon receiving the updated map information that contains a list of translation, rotation and features, matches the new obtained features from the sliding window with the features in the map. When there are matched features, the loop closure detection module 322 may use the matched features to detect whether a loop of route is formed. In certain embodiments, the matching is performed using only the immortal stable features, so as to have an efficient and accurate matching process. The loop closure detection module 322 then sends the rotation, the translation, the features including the matched features (if available), to the global state optimization module 224.

After receiving the translation, rotation and features corresponding to previous frames and the recent frames in the sliding window, at procedure 324, the global state optimization module 224 then optimizes six DOF (rotation and translation) of the mapping device 100 by solving an optimization problem to reduce re-projection error of features. After optimization, for the matched features, one of the matched features is removed, and one of the matched feature is kept.

In parallel with the procedures 322 and 324, at procedure 326, the local state optimization module 226, upon receiving the list of rotation, translation, and features in a short window (for example, the sliding window), optimizes six DOF (rotation and translation) of the pose of the mapping device 100 by solving an optimization problem to reduce re-projection error of features. In certain embodiments, the local state optimization module 226 uses the gradient decent method on feature 3D location in global frame and robot 3D location frame and minimize the difference of the sum of feature re-projection error in all the frame in the short window. The features used here include immortal stable features and temperate stable features, so as to provide more information for the accurate local optimization. After the local state optimization, the local state optimization module 226 sends the six DOF of the device pose to the local state outputting module 228, and sends the six DOF and the features to the mapping module 230.

Subsequently, the local state outputting module 228 communicates with other components that requires the current pose of the mapping device 100, or communicates with other devices, such as a central server computing device.

In response to receiving the rotation, the translation, the features including matched features from the global state optimization module 224, and the rotation, translation and features of the recent frames from the local state optimization module 228, at procedure 330, the mapping module 230 updates the map. Because the mapping module 230 uses both the overall information especially the matched features provided by the global state optimization module 224 and the accurate current pose provided by the local state optimization module 228, the updated map is complete and accurate. When there is no map available, at procedure 330, the mapping module 230 can also construct an initial map based on the information from the first set of frames, such as information from two or more frames. The performing of the procedure 320-326 relates to access of the map. For example, the procedure 322 and 324 are used to update the global features and poses of the map, and the procedure 326 is used to update the recent poses of the map.

As shown in FIG. 3, in certain embodiments, the procedure 310 and 312 form thread 1, the procedure 314 and 316 form thread 2, the procedure 322 and 324 form thread 3, and the procedure 326 and 328 form thread 4. The arrangement divides the method into four threads. The four threads are executed in parallel, thus improves the efficiency of the whole process.

In a further aspect, the present invention is related to a non-transitory computer readable medium storing computer executable code. The code, when executed at a processor 112 of the mapping device 100, may perform the method 300 as described above. In certain embodiments, the non-transitory computer readable medium may include, but not limited to, any physical or virtual storage media. In certain embodiments, the non-transitory computer readable medium may be implemented as the storage device 116 of the mapping device 100 as shown in FIG. 1.

In certain embodiments, the mapping device 100 of the present invention includes a smart phone, a tablet, a computer, a drone, a robot, or the like, and the environment includes an indoor environment such as a ware house, or an outdoor environment. In certain embodiments, other applications can be combined with the accurate updating of the 3D map and the calculation of the pose of the device.

Figure 4A:
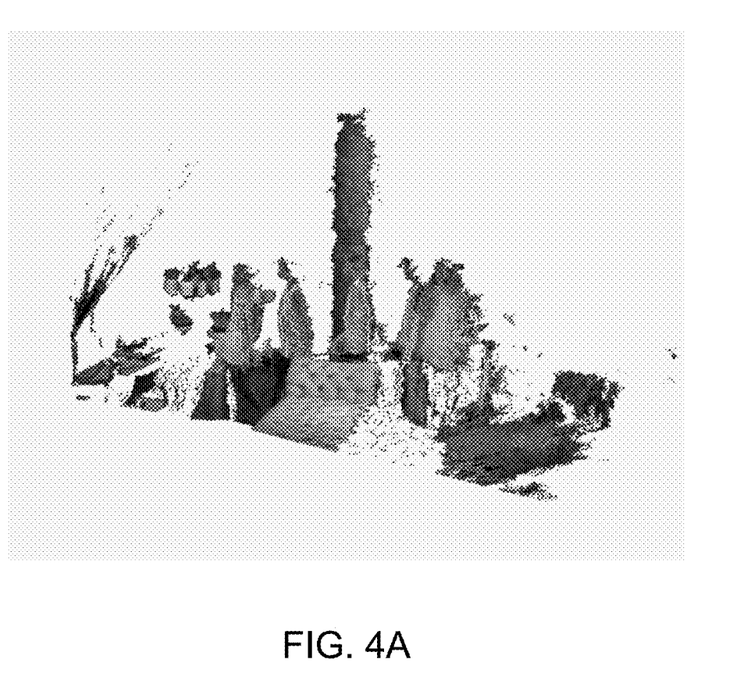
FIG. 4A schematically depicts an exemplary map.
Figure 4B:
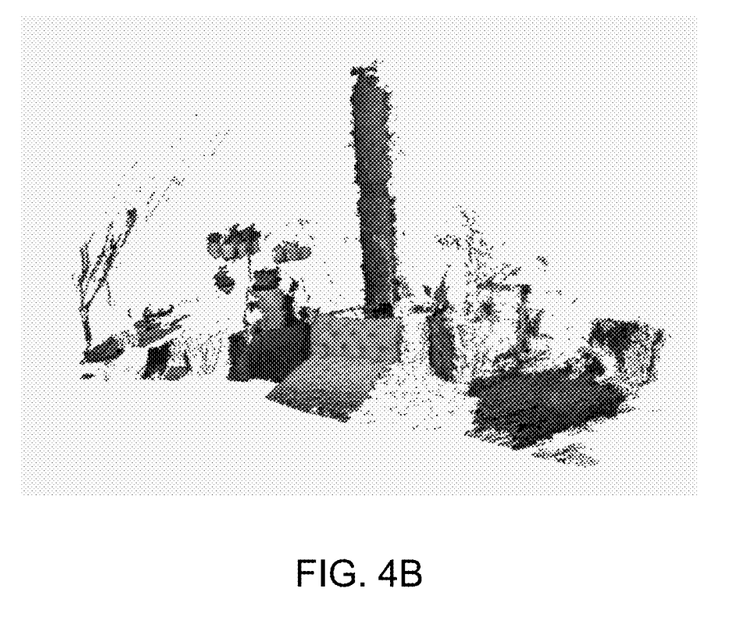
FIG. 4B schematically depicts the exemplary map of FIG. 4A after processing by the method according to certain embodiments of the present invention.

FIGS. 4A-4B schematically show images before the feature screening and after the screening according to certain embodiments of the present invention. As shown in FIG. 4A, a moving object, such as a human, shows in different locations of a series of video frames. As show in FIG. 4B, after feature screening, the moving object, i.e. the human, is removed from each of the video frames. Therefore, the processed video frames don't include information of the moving human.

In summary, certain embodiments of the present invention, among other things, have the following advantages over related art.

First, the features or objects in the frames are categorized into three groups: dynamic environment, temperate stable environment, and immortal stable environment. The use of the three categories instead of tens of hundreds or more categories make the calculation of poses and detection of the loop, etc. fast, so that the update of the map is efficient. Further, since the stable environment represents the actual environment better than the dynamic environment, the removing of the dynamic environment makes the mapping process more accurate and less errors would occur.

Second, the mapping process contains four parallel running threads, and the use of the four threads applies the computing resources efficiently, which improves the efficiency of the computing device or the controller.

Further, by removing noisy dynamic information from the images, the calculation of the mapping and localization is fast, and the accuracy of the mapping and localization is high. Therefore, in certain embodiments, the present invention relates to a semi-dense or a dense SLAM, with the incorporation of removing dynamic environment and optionally temperate stable environment in certain steps of SLAM.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method for performing localization and mapping of a mapping device, comprising:

capturing images of environment by a visual sensor of the mapping device, and processing the captured images to obtain a set of high-resolution images and a set of low-resolution images;

determining motion-scale measurement of the mapping device using an inertial sensor and an odometer;

generating, by a controller of the mapping device, a first mask corresponding to dynamic features in the low-resolution images;

generating, by the controller of the mapping device, a second mask corresponding to temperate stable features in the low-resolution images using deep neural network (DNN);

generating, by the controller of the mapping device, a third mask corresponding to stable features in the low-resolution images using DNN;

extracting, by the controller, features from the high-resolution images;

recovering, by the controller, poses of the mapping device based on the high-resolution images and the motion-scale measurements;

filtering out, by the controller, the features from the high-resolution images that correspond to the first mask, to obtain filtered features; and performing, by the controller, localization and mapping using the poses and the filtered features.

2. The method of claim 1, wherein the low-resolution images are RGB images, and the high-resolution images are gray images.

3. The method of claim 1, wherein the first mask is generated using DNN.

4. The method of claim 3, wherein the generating of the first, second and third mask using DNN comprises:

performing DNN classification on the low-resolution images, such that objects in the low-resolution images are identified and classified as the dynamic features, the temperate stable features, and the immortal stable features; and generating the first, second and third masks respectively corresponding to the dynamic features, the temperate stable features, and the immortal stable features.

5. The method of claim 1, wherein the step of processing the captured images comprises: adjusting format, size, and light balance of the images.

6. The method of claim 1, wherein the step of determining motion-scale measurement comprises:

obtaining inertial measurements from the inertial sensor and distance measurement from the odometer continuously; and integrating the inertial measurements and distance measurements to determine the motion-scale measurements of the mapping device.

7. The method of claim 1, further comprising, after the step of filtering out the features from the high-resolution images to obtain filtered features: determining if any one of the high-resolution images is a key frame.

8. The method of claim 7, further comprising, after the step of filtering out the features from the high-resolution images to obtain filtered features: setting up a sliding window to store a predetermined number of the high-resolution images.

9. The method of claim 1, further comprising, before the step of performing location and mapping: synchronizing the motion-scale measurement with the high-resolution images.

10. The method of claim 9, wherein the filtered features comprise temperate stable features and immortal stable features, and the step of performing localization and mapping using the poses and the filtered features comprises:

detecting loop closure and optimizing global state using the poses and the immortal stable features;

optimizing local state using the poses, the temperate stable features and the immortal stable features; and updating a map of the environment based on the optimized global state and local state.

11. The method of claim 10, wherein the generating a first mask is executed in a first thread, the recovering the poses is executed in a second thread, the detecting loop closure and optimizing global state is executed in a third thread, and optimizing local state is executed in a fourth thread, wherein the first, second, third, and fourth threads are executed in parallel in a processor of the controller.

12. The method of claim 1, wherein each of the poses comprises a rotation and a translation of the mapping device corresponding to one of the high-resolution images.

13. The method of claim 1, wherein the mapping device comprises a ground robot, an augmented reality (AR) device, a virtual reality (VR) device, a three-dimensional (3D) map reconstruction device, and an unmanned aerial vehicle (UAV).

14. A mapping device, comprising, a visual sensor configured to capture images of environment;

an inertial sensor and an odometer, configured to determine motion-scale measurement of the mapping device; and a controller, configured to:

process the captured images to obtain a set of high-resolution images and a set of low-resolution images;

perform deep neural network (DNN) classification on the low-resolution images such that objects in the low-resolution images are identified and classified as dynamic features, temperate stable features, and immortal stable features;

generate a first mask, a second mask, and a third mask corresponding to the dynamic features, the temperate stable features, and the immortal stable features, respectively;

extract features from the high-resolution images;

recover poses of the mapping device based on the high-resolution images and the motion-scale measurements;

filter out the features from the high-resolution images that correspond to the first mask, to obtain filtered features; and perform localization and mapping using the poses and the filtered features.

15. The mapping device of claim 14, wherein the controller is configured to process the captured images by: adjusting format, size, and light balance of the images.

16. The mapping device of claim 14, wherein the controller is configured to generate the first mask in a first thread, recover the poses in a second thread, detect loop closure and optimize global state in a third thread, and optimize local state in a fourth thread, and the first, second, third, and fourth threads are executed in parallel in a processor of the controller.

17. A non-transitory computer readable medium storing computer executable code, wherein the computer executable code, when executed at a processor of a controller of a mapping device, is configured to:

process images of environment captured by a visual sensor, to obtain a set of high-resolution images and a set of low-resolution images;

perform deep neural network (DNN) classification on the low-resolution images such that objects in the low-resolution images are identified and classified as dynamic features, temperate stable features, and immortal stable features;

generate a first mask, a second mask, and a third mask corresponding to the dynamic features, the temperate stable features, and the immortal stable features, respectively;

extract features from the high-resolution images;

recover poses of the mapping device based on the high-resolution images and motion-scale measurements determined from an inertial sensor and an odometer;

filter out the features from the high-resolution images that correspond to the first mask, to obtain filtered features; and perform localization and mapping using the poses and the filtered features.

18. The non-transitory computer readable medium of claim 17, wherein the computer executable code is configured to:

generate the first, second and third masks in a first thread, recover the poses in a second thread, detect loop closure and optimize global state in a third thread, and optimize local state in a fourth thread, and the first, second, third, and fourth threads are executed in parallel in the processor.

* * * * *